(12) United States Patent
Ishimoda et al.

(10) Patent No.: US 7,635,228 B2
(45) Date of Patent: Dec. 22, 2009

(54) LENS BARREL, CAMERA EQUIPPED WITH THE LENS BARREL AND METHOD OF ASSEMBLING THE LENS BARREL

(75) Inventors: Isao Ishimoda, Hachioji (JP); Yukio Kunisada, Hino (JP)

(73) Assignee: Konica Minolta Opto, Inc., Tokyo (JP)

( * ) Notice: Subject to any disclaimer, the term of this patent is extended or adjusted under 35 U.S.C. 154(b) by 415 days.

(21) Appl. No.: 11/261,239

(22) Filed: Oct. 27, 2005

(65) Prior Publication Data

US 2006/0093347 A1 May 4, 2006

(30) Foreign Application Priority Data

Nov. 4, 2004 (JP) .............................. 2004-320331

(51) Int. Cl.
- *G03B 15/00* (2006.01)
- *G02B 15/14* (2006.01)
- *G02B 17/00* (2006.01)
- *G02B 9/12* (2006.01)
- *G02B 13/16* (2006.01)

(52) U.S. Cl. ........................ 396/351; 359/704; 359/735; 359/784; 348/335

(58) Field of Classification Search ................. 396/351, 396/348, 349, 535; 348/686, 694, 704, 335, 348/345, 374, 240.99, 240.3; 359/686, 694, 359/704, 642, 695, 696, 716, 726, 735, 784, 359/823

See application file for complete search history.

(56) References Cited

U.S. PATENT DOCUMENTS

| 5,231,473 | A  | * | 7/1993 | Kawamura et al. .......... 359/694 |
| 6,556,359 | B2 | * | 4/2003 | Emura et al. ................. 359/704 |
| 7,057,829 | B2 | * | 6/2006 | Tanigawa et al. ............ 359/704 |
| 2003/0107667 | A1 | | 6/2003 | Abe et al. |

FOREIGN PATENT DOCUMENTS

JP 2003-222946 8/2003

* cited by examiner

*Primary Examiner*—Rochelle-Ann J Blackman
(74) *Attorney, Agent, or Firm*—Cohen Pontani Lieberman & Pavane LLP

(57) ABSTRACT

A lens barrel including a first moving lens group for advancing light of a subject onto an image plane, a second moving lens group for advancing light of the subject onto the image plane, a shaft section for guiding the first moving lens group and the second moving lens group in a direction of an optical axis, an intermediate positioning section for supporting the shaft section at an intermediate portion of the shaft section, and an end positioning section for supporting one end of the shaft section, wherein the first moving lens group slides on a portion of the shaft section that is closer to the subject than the intermediate positioning section is, and wherein the second moving lens group slides on a portion of the shaft section that is closer to the image plane than the intermediate positioning section is.

8 Claims, 6 Drawing Sheets

LENS BARREL, CAMERA EQUIPPED WITH THE LENS BARREL AND METHOD OF ASSEMBLING THE LENS BARREL

This application is based on Japanese Patent Application No. 2004-320331 filed on Nov. 4, 2004 in the Japanese Patent Office.

BACKGROUND OF THE INVENTION

The present invention relates to a lens barrel with a variable magnification optical system that has a plurality of lens groups through which a ray of a photographic object passes, and changes magnification by moving prescribed lens groups.

Cameras each carrying a camera lens (hereinafter referred to also as a zoom lens) having a variable focal length have so far been on the market. In each of these zoom lenses, a focal length thereof is changed when plural lens groups constituting the optical system of the zoom lens are moved so that a distance between the zoom lenses may be changed.

A method to move plural lens groups to be in parallel with an optical axis is roughly divided into two types; one of them is one wherein a cam cylinder on which a cam groove is formed and a cam pin that engages with the cam groove are formed on the outer circumference of a lens frame, and the lens frame is engaged with a straightforward guide, and the lens frame is moved straight when the cam cylinder is rotated, and the other is one wherein a shaft is arranged to be substantially in parallel with an optical axis to be a guide shaft for a straightforward guide, and a sleeve on which the guide shaft penetrates through the lens frame is formed, thus, the lens frame is caused by a stepping motor and a lead screw to slide along the guide shaft directly, for its straightforward movement.

The latter one stated above employing the guide shaft arranged to be mostly in parallel with an optical axis is used frequently for the photographing optical system of a camera that requires no degeneracy, because it can be of a simple structure, requiring neither cam cylinder in a complicated cam shape nor a complicated structure of lens barrel.

There is disclosed a structure wherein the one employing the guide shaft arranged to be substantially in parallel with an optical axis is applied to a light-reflecting optical system, two lens groups are moved by two motors, and a movement of an engagement member that engages with a lead screw of the motor on one side is transmitted to the lens group on the finder side (for example, see Patent Document 1). This Patent Document 1 discloses a structure of a lens barrel of the light-reflecting optical system.

[Patent Document 1] JP-A 2003-222946 (FIG. 2-FIG. 6)

A zoom lens has therein a plurality of lens groups, and is arranged so that prescribed lens groups among them move on an optical axis in its direction to change a focal length, and it is general that an allowable error of an optical axis deviation between respective lens groups in these plural lens groups varies depending on an individual lens group constituting the zoom lens.

In recent years, there is carried out the so-called center-aligning wherein a lens frame is formed so that a lens may be moved in the direction perpendicular to its optical axis, and an optical axis of a certain lens group and that of another lens group facing the aforesaid lens group can be aligned highly accurately by moving the lens for fine adjustment on the lens frame, without relying on parts accuracy of the lens and the lens frame holding the lens. Owing to this center-aligning, a problem of decentering has been dissolved, making it possible to obtain a camera lens with stable performance that causes no individual difference on an image taken by the camera lens.

On the other hand, in the structure of a lens barrel of a light-reflecting optical system described in the Patent Document 1 stated above, the lens barrel is divided into a barrel member that includes a reflection member for light-reflecting optical system and includes a fixed lens group on the subject side and a box-shaped barrel member that is arranged behind the aforesaid barrel member and includes both movable lens groups and fixed lens group.

In the case of this structure of a lens barrel, a guide shaft is incorporated in the box-shaped barrel member under the condition that all lens groups engaging with the guide shaft are incorporated. Therefore, it is impossible to select specific lens groups from movable lens groups and fixed lens groups which are arranged behind for aligning optical axes more accurately, and to conduct center-aligning for specific lens groups. In addition, there is no space for inserting a jig for moving a lens for fine adjustment when conducting center-aligning, resulting in a problem that the box-shaped barrel member interposes an obstacle in the course of center-aligning.

SUMMARY OF THE INVENTION

In view of the problems stated above, the present invention relates to a lens barrel having a structure wherein a guide shaft arranged to be substantially in parallel with an optical axis is used, and lens groups slide on this guide shaft to move straight, and its object is to obtain the lens barrel wherein it is possible to conduct aligning of axis accurately for desired specific lens groups among lens groups constituting the camera lens and to make center-aligning for specific lens groups possible, and thereby to dissolve a problem of decentering between lens groups to make a camera lens with stable performance that causes no individual difference on an image taken by the camera lens, and to obtain a camera equipped with the camera lens with stable performance that causes no individual difference, by using the aforesaid lens barrel.

The aforementioned objects can be attained by the following structures.

Structure 1

A lens barrel having therein a plurality of lens groups for advancing light of a subject and a guide shaft that enables at least two lens groups among the plural lens groups mentioned above to slide in the direction of an optical axis, wherein there is provided a structure so that a positioning member that positions the guide shaft at an intermediate portion of the guide shaft is provided, the guide shaft is supported on its end on one side and on the positioning member, at least one lens group among lens groups sliding on the guide shaft slides on the portion that is closer to the image plane side than the positioning member is, and another one lens group at least slides on the portion that is closer to the subject side than the positioning member is.

Structure 2

The lens barrel according to Structure 1 wherein the end on one side supporting the guide shaft is an end portion positioned to be closer to the image plane side.

Structure 3

The lens barrel according to Structure 1 or Structure 2 wherein the positioning member holds a fixed lens group, and the fixed lens group is fixed after being subjected to center aligning for the lens group that is positioned between an end on one side and the positioning member both supporting the guide shaft.

Structure 4

The lens barrel according to any one of Structure 1-Structure 3 wherein the lens barrel is structured to be divided into a first barrel member including at least a lens group that slides on the portion closer to the subject side than the positioning member is and a second barrel member including at least a lens group that slides on the portion closer to the image plane side than the positioning member is.

Structure 5

The lens barrel according to any one of Structure 1-Structure 4 wherein a refection member that reflects the light of a subject by about right angles is provided to be closer to the subject side than the lens group sliding on the guide shaft is, and an end portion on the other side of the guide shaft is formed to be extended toward the side of the refection member.

Structure 6

A camera equipped with a lens barrel in any one of Structure 1-Structure 5.

Structure 7

A method of assembling a lens barrel structured to cause plural lens groups for advancing light of a subject and a desired lens group among the plural lens groups to slide on the guide shaft that is substantially in parallel with an optical axis, to move straight, wherein there are provided a process to fix an end portion on one side of the guide shaft, a process to incorporate a lens frame holding movable lens groups in the guide shaft, a process to fit a positioning member that positions the guide shaft at the intermediate portion of the guide shaft around the guide shaft to fix them, a process to place a lens group on the positioning member and to fix the lens group placed on the positioning member and a process to incorporate other lens groups on the guide shaft.

Structure 8

The method of assembling a lens barrel according to the Structure 7 wherein, in the course of placing a lens group on the positioning member and of fixing the lens group placed on the positioning member, center-aligning of the lens group placed on the positioning member is conducted for the movable lens group.

DETAILED DESCRIPTION OF THE PREFERRED EMBODIMENT

The present invention will be explained in detail as follows, referring to embodiments to which, however, the invention is not limited.

Figure 1:
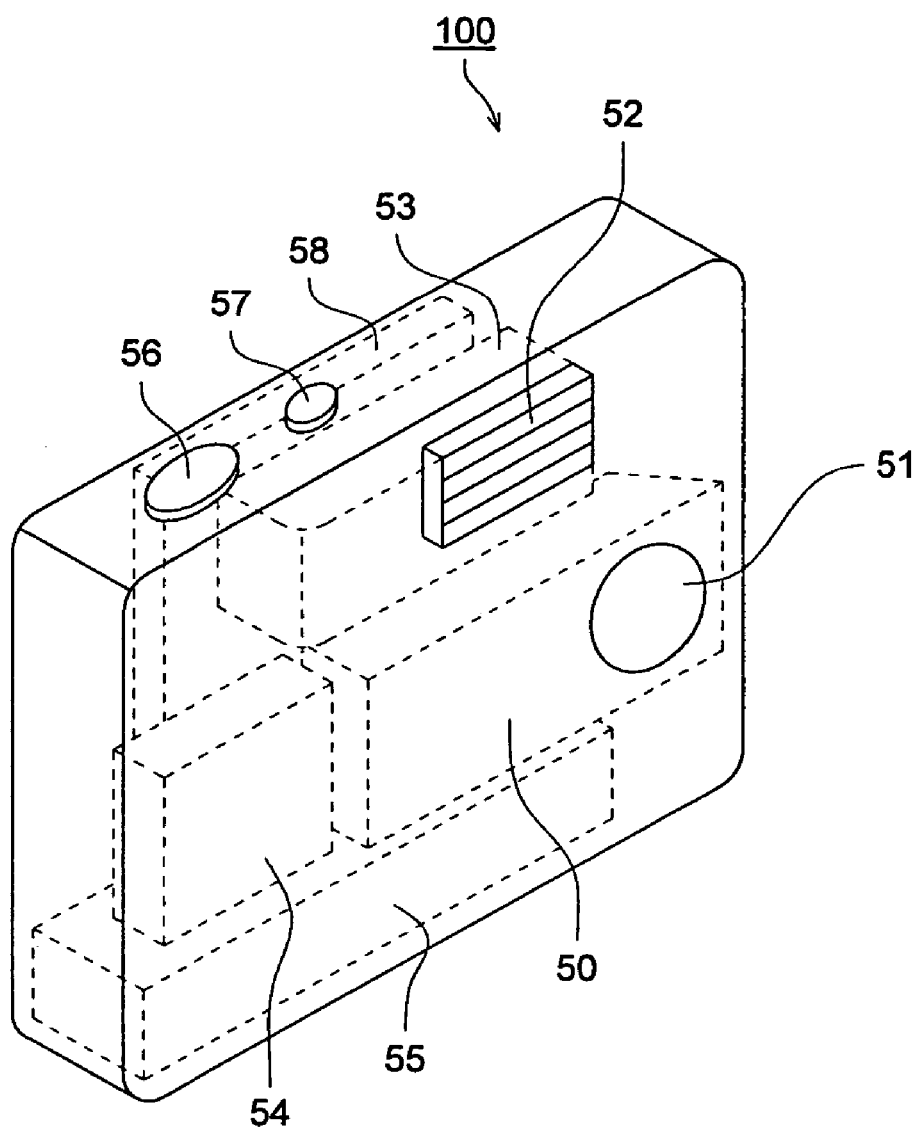
FIG. 1 is a diagram showing an example of an internal arrangement of primary constructing units of a camera equipped with a lens barrel relating to the invention.

FIG. 1 is a diagram showing an example of an internal arrangement of a primary constructing units of camera 100 equipped with a lens barrel relating to the invention. FIG. 1 is a perspective view wherein camera 100 is viewed from the subject side.

On camera 100, lens barrel 50 relating to the invention including therein a reflecting imaging optical system capable of changing magnification is arranged along the front surface as illustrated and opening 51 is arranged in a way that light fluxes from a subject are surrounded by the opening, as illustrated in the same drawing. There is arranged a lens barrier for opening and closing the opening 51, though it is not illustrated.

The numeral 52 represents a flashing window and the numeral 53 represents a flash unit composed of a reflector, a xenon tube, a maim capacitor and a circuit board. An image recording memory of a card type is represented by 54, and a battery supplying a power source to each portion of camera 100 is represented by 55. The image recording memory 54 and battery 55 can be loaded in or unloaded from the camera through an unillustrated lid.

On the top of the camera 100, there is arranged release button 56, and when the release button is given the first pressure, there are conducted preparation actions, namely, focusing actions and photometry actions are carried out, and when the second pressure is given to the release button, exposure actions for photographing are carried out. The numeral 57 represents a main switch which is one to switch the camera 100 between the state of operations and the state of non-operation. When switched to the state of operations by the main switch 57, the lens barrier is opened when it is provided, and operations of each section are started. When switched to the state of non-operation by the main switch 57, the lens barrier is made to be in the closed state, and operations of each section are terminated.

On the back of the camera 100, there is arranged image display section 58 that is composed of display elements such as LCD or organic EL and displays images and character information. There are further arranged operation members such as zoom buttons to conduct zoom-up and zoom-down, a reproduction button to reproduce images taken, menu button that displays various menus on image display section 58 and selection button that selects a desired function from the display.

A circuit board that has various electronic parts and connects respective parts is arranged between these primary constructing units, to drive and control each primary constructing unit, which is not illustrated.

There are further provided an external I/O terminal, a trap fixing section and a tripod seat, which are not shown again.

Figure 2:
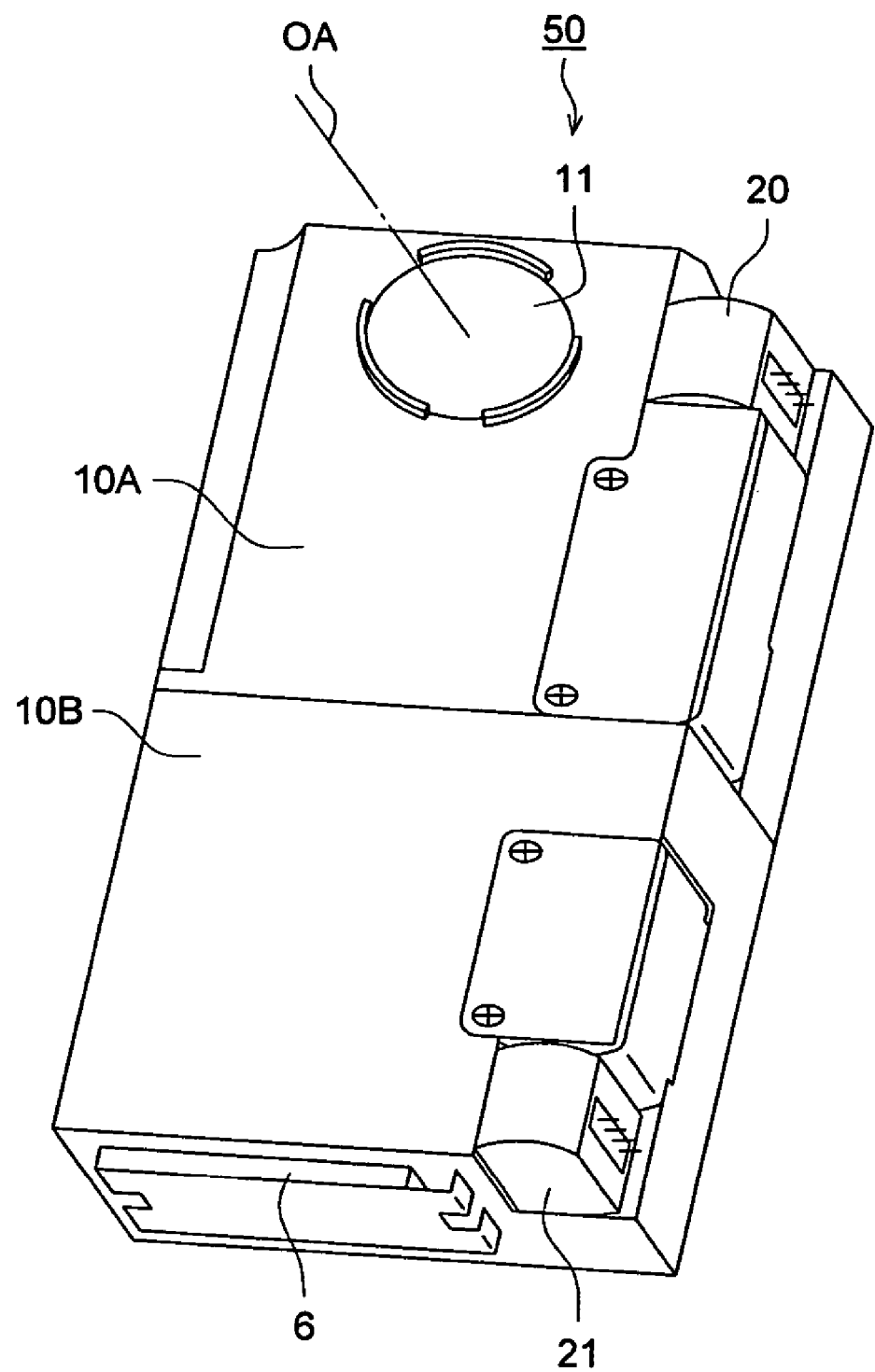
FIG. 2 is a schematic perspective view of the state of a unit of a lens barrel relating to the invention.

FIG. 2 is a schematic perspective view of the state of a unit of lens barrel 50 relating to the invention.

As shown in the same drawing, the lens barrel 50 is composed of two lens barrels including first main barrel 10A representing the first lens barrel and second main barrel 10B representing the second lens barrel. In the first main barrel 10A, there is incorporated first motor 20 that moves a lens group arranged inside, and in the second main barrel 10B, there is incorporated second motor 21 that moves another lens group arranged inside. The numeral 6 represents an imaging element which is incorporated in the second main barrel 10B. The numeral 11 represents a lens arranged to be closest to the subject, and the lens 11 is arranged so that its optical axis OA may point to the subject.

First motor 20, second motor 21 and imaging element 6 are connected to an unillustrated printed board to be controlled and driven individually.

Figure 3:
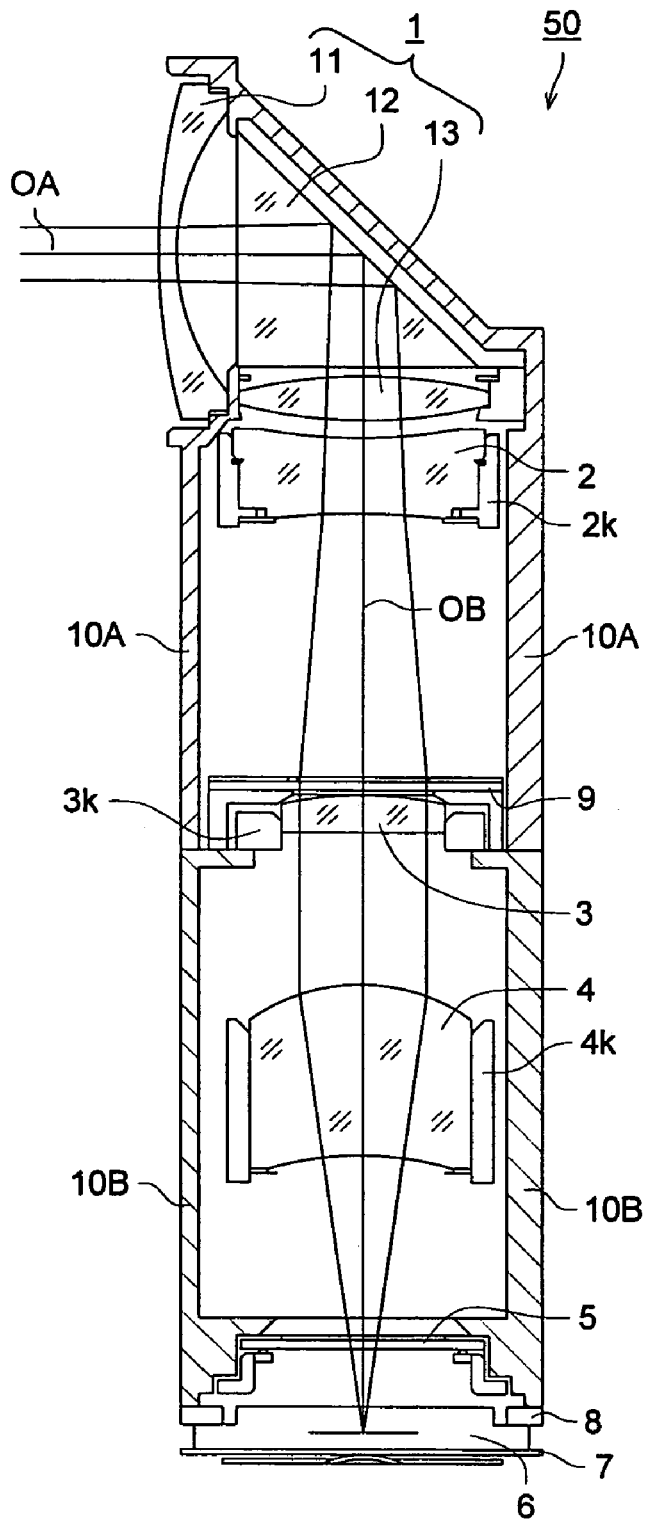
FIG. 3 is a cross-sectional view showing a reflecting imaging optical system that is included in the lens barrel of the invention and is capable of changing magnification.

FIG. 3 is a cross-sectional view showing a reflecting imaging optical system that is included in the lens barrel 50 of the invention and is capable of changing magnification. FIG. 3 shows a state of a mode of wide angle and is a cross-sectional view taken on a plane including an optical axis before reflecting of light and that after reflecting of light.

As shown in FIG. 3, OA represents an optical axis before reflecting of light, while, OB represents an optical axis after reflecting of light. An outside of the lens barrel 50 is composed of first main barrel 10A representing the first lens barrel member and second main barrel 10B representing the second lens barrel member.

The numeral 1 represents a first lens group which is composed of lens 11 that is arranged so that its optical axis OA may point to the subject, prism 12 representing a reflecting member that reflects optical axis OA by about 90 degrees and lens 13 arranged to have optical axis OB resulted from reflecting by the prism 12. This first lens group is a lens group fixed on the first main barrel 10A.

The numeral 2 represents a second lens group which is incorporated in second lens group holder 2k. The second lens group is a lens group that moves together with the second lens group holder 2k solidly in the case of changing magnification (hereinafter referred to also as zooming).

The numeral 3 represents a third lens group which is incorporated in positioning member 3k. Incidentally, the positioning member 3k will be explained in detail later, referring to FIGS. 4 and 5. This third lens group 3 is a lens group that is incorporated in the second main barrel 10B to be immobilized.

The numeral 4 represents a fourth lens group which is incorporated in fourth lens group holder 4k. The fourth lens group is a lens group that moves together with the fourth lens group holder 4k solidly in the case of changing magnification and of adjusting a focal length (hereinafter referred to also as focusing).

The numeral 5 represents an optical filter on which an infrared blocking filter and an optical low pass filter are laminated, and it is incorporated in the second main barrel 10B. The numeral 6 represents an imaging element, and it includes CCD (Charge Coupled Device) type image sensor and CMOS (Complementary Metal-Oxide Semiconductor) type image sensor, as one to be used. The imaging element 6 is fixed on fixing seat 8, and the fixing seat 8 is incorporated in the second main barrel 10B together with imaging element 6. Flexible printed board is represented by the numeral 7, and it is connected to the imaging element 6 to be connected to other circuits in the camera. A shutter unit is represented by 9, and it is fixed on the second main barrel 10B, in the same way in positioning member 3k.

Figure 4:
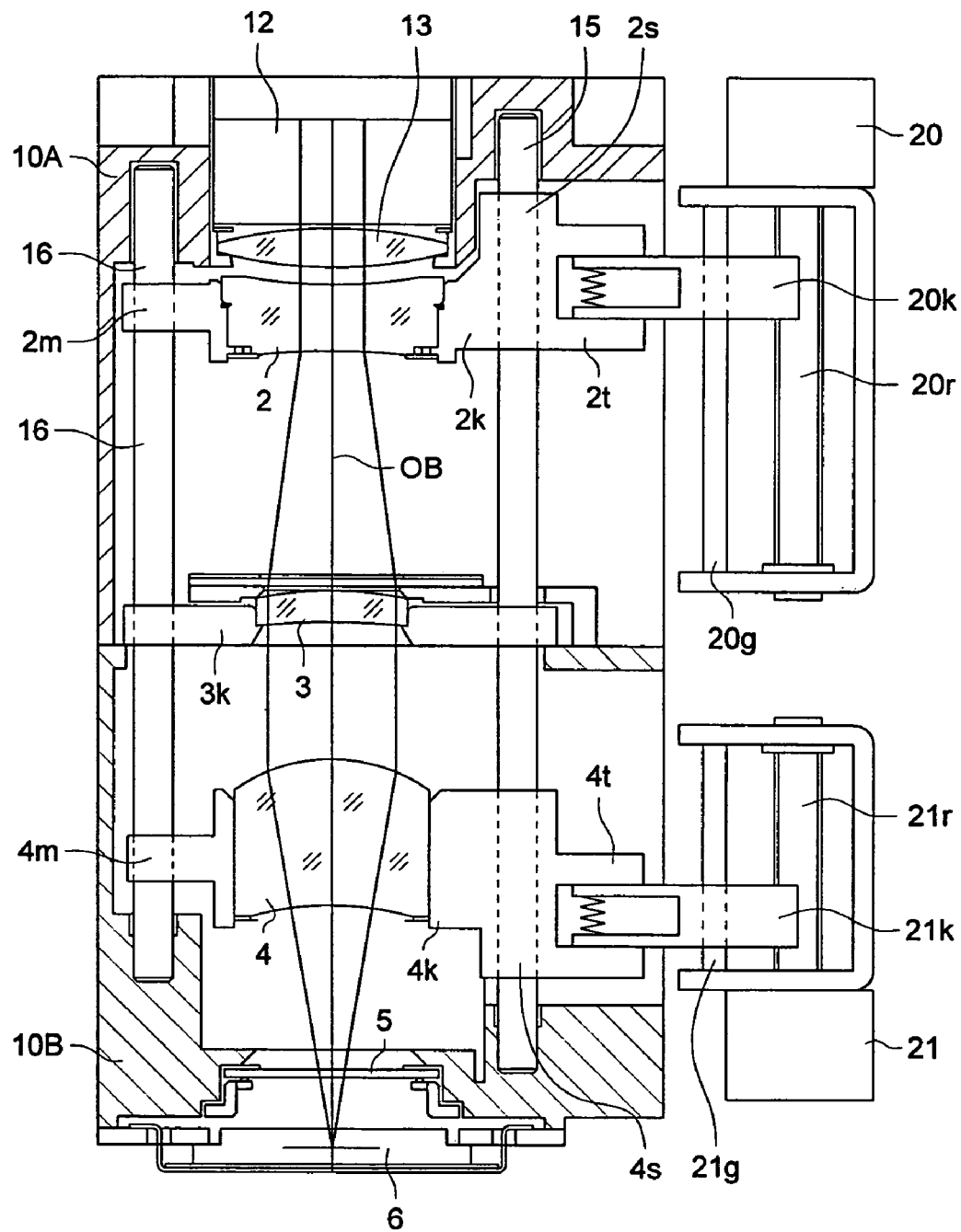
FIG. 4 is a schematic diagram showing a schematic structure of the movement mechanism and the inside for the second and fourth lens groups.

FIG. 4 is a schematic diagram showing a moving mechanism and inner schematic structures of the second lens group 2 (which is a first moving lens group) and the fourth lens group 4 (which is a second moving lens group). The FIG. 4 shows the state in which the second lens group 2 and the fourth lens group 4 are in the positions of wide angle. In the following drawings, the same symbols are given to those having the same functions, for avoiding overlapping of explanation. Incidentally, for easy understanding of the explanation, positions of motors are moved to the outside of the lens barrel to attain schematic diagrams.

As shown in FIG. 4, guide shaft 15 is provided to pass through sleeve 2s formed solidly on the second lens group holder 2k and sleeve 4s formed solidly on the fourth lens group holder 4k. Further, guide shaft 16 is provided to engage with anti-rotation section 2m formed solidly on the second lens group holder 2k and with anti-rotation section 4m formed solidly on the fourth lens group holder 4k. Owing to this, the second lens group holder 2k and the fourth lens group holder 4k are made to be capable of sliding on the guide shaft 15 and the guide shaft 16 in the direction of optical axis OB.

Meanwhile, the guide shaft 15 and the sleeve 2s are extended to the side of prism 12 to be formed as shown in FIG. 4. By doing this, it is possible to secure a sufficient length of fit for the sleeve 2s without increasing the total length of the lens barrel, whereby, the second lens group holder 2k, namely, the second lens group 2 can slide smoothly.

The second lens group holder 2k has forked projection 2t formed on sleeve 2s, and this projection 2t is engaged with driving member 20k that is moved by rotation of lead screw 20r that is formed on a rotating shaft of first motor 20 representing a stepping motor. Due to this, the second lens group holder 2k that is engaged with driving member 20k is moved by rotation of the first motor 20 in the direction of optical axis OB to slide on the guide shaft 15 and guide shaft 16. Incidentally, 20g represents a guide shaft on which the driving member 20k slides.

In the same way, the fourth lens group holder 4k has forked projection 4t formed on sleeve 4s, and this projection 4t is engaged with driving member 21k that is moved by rotation of lead screw 21r that is formed on a rotating shaft of second motor 21 representing a stepping motor. Due to this, the fourth lens group holder 4k that is engaged with driving member 21k is moved by rotation of the second motor 21 in the direction of optical axis OB to slide on the guide shaft 15 and guide shaft 16. Incidentally, 21g represents a guide shaft on which the driving member 21k slides.

Owing to this, each of the second lens group 2 and the fourth lens group 4 moves, for zooming, by a predetermined amount in the direction to approach the third lens group 3 from the position in the state of wide angle mode. The fourth lens group 4 is further arranged so that focusing is carried out when the fourth lens group 4 is moved further from the position to which it is moved for zooming.

The guide shafts 15 and 16 are positioned as follows.

Each of the guide shafts 15 and 16 is fixed with its end portion on one side being positioned on the second main barrel 10B, as illustrated. This fixing is conducted by means of adhesion after inserting the end portion in a hole formed on the second main barrel 10B through press fitting or fitting. Further, another portion of each of the guide shafts 15 and 16 is positioned by positioning member 3k that is located at the intermediate portion of the guide shafts 15 and 16 and is incorporated in the second main barrel 10B.

On the positioning member 3k, there are formed two holes for fitting through which the guide shafts 15 and 16 respectively pass to be fitted, positioning sections 3h and 3u each being positioned mutually with the second main barrel 10B and a lens holding portion in which the third lens group 3 is incorporated, whereby, the positioning member 3k engages with a positioning section formed on the second main barrel 10B mutually to be positioned and fixed. Thus, the guide shafts 15 and 16 which pass through two holes for fitting respectively are positioned. Further, end portions on the other side of respective guide shafts 15 and 16 are arranged not to be in contact with the first main barrel 10A.

Namely, in the aforesaid structure, each of the guide shafts 15 and 16 is positioned and supported at its end portion on one slide located to be closer to an image plane and by the positioning member 3k that positions at an intermediate portion of the guide shafts 15 and 16, and the second lens group 2 slides at a portion that is closer to the subject than the positioning member is on the guide shaft, while, the fourth lens group 4 slides on the guide shaft at a portion that is closer to an image plane than the positioning member 3k is, that is, a portion between the end portion of the guide shaft supported by the second main barrel 10B and the positioning member 3k.

Meanwhile, there are arranged a position sensor that detects existence of the second lens group 2 and a position sensor that detects existence of the fourth lens group 4, which are not illustrated. As a position sensor, a photo-interrupter, for example, is used. This position sensor is one to judge whether a covering section formed on each of second lens group holder 2k and fourth lens group holder 4k is at a position between light-emitting-receiving devices of respective position sensors to cover, or at a position where the covering section does not cover the light-emitting-receiving device, thus, a direction of rotation and an amount of rotation for each of the first motor 20 and the second motor 21 are controlled, and positions of the lens groups are controlled.

How to assemble the lens barrel of the invention and how the lens barrel is composed will be explained more fully as follows.

Figure 5:
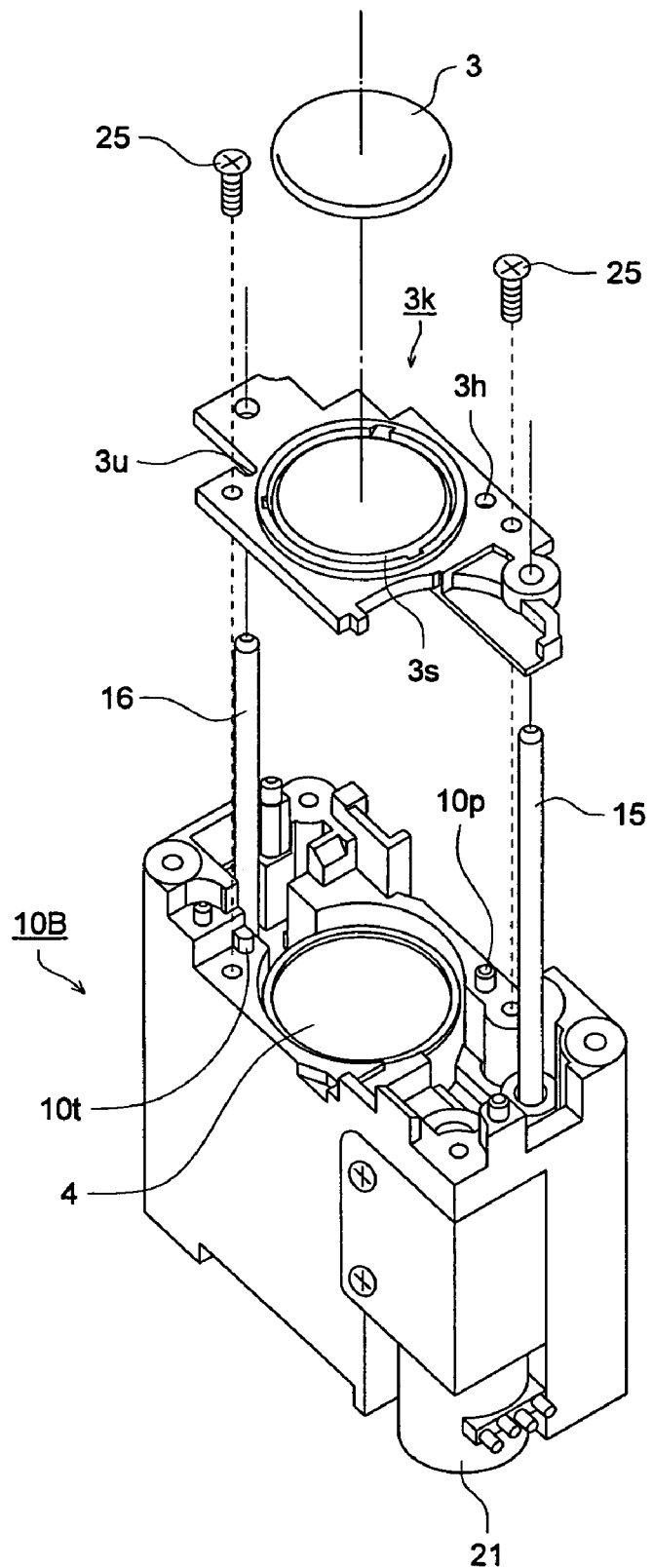
FIG. 5 is a diagram showing how a positioning member and the third lens group are incorporated in the second main barrel.

FIG. 5 is a diagram showing how the positioning member 3k and the third lens group 3 are incorporated in the second main barrel 10B. There will be explained as follows, in accordance with an order of incorporating procedures.

With respect to the second main barrel 10B, there are shown the state of affairs after there are conducted a process in which an end portion on one side closer to an image plane on each of guide shafts 15 and 16 is fixed in a hole formed on the second main barrel 10B through press fitting or fitting plus adhesion, a process to incorporate the fourth lens group holder 4k that holds the fourth lens group 4 representing the movable lens group on the guide shafts 15 and 16 and further a process to incorporate the second motor 21 so that driving member 21k of the second motor 21 may engage with projection 4t formed on the fourth lens group holder 4k (see FIG. 4).

Positioning member 3k is incorporated in the second main barrel 10B through the process to fit and fix positioning member 3k that positions the direction of the shaft at intermediate portions of guide shafts 15 and 16. Positioning of positioning member 3k for the second main barrel 10B is carried out when hole 3h and U-shaped portion 3u both formed on positioning member 3k engage respectively with pin 10p and projection 10t both formed on the second main barrel 10B.

Namely, as shown with one-dot chain lines in the same drawing, the hole 3h is engaged with the pin 10p and the U-shaped portion 3u is engaged with the projection 10t while the guide shafts 15 and 16 are made to pass respectively through two holes for fitting formed on positioning member 3k for fitting, so that they are fixed on the second main barrel 10B with screws 25. Owing to this, the positioning member 3k is positioned for the second main barrel 10B, and directions of the guide shafts 15 and 16 are determined by two holes for fitting on the positioning member 3k. This determines the direction for the fourth lens group holder 4k, namely, for the fourth lens group 4 to move by sliding.

The positioning of the positioning member 3k for the second main barrel 10B may also be carried out by the use of a jig, and in this case, the precision of positioning can further be improved, and a direction of each of the guide shafts 15 and 16 can be determined more precisely.

After this, there is conducted the process of center-aligning wherein the third lens group 3 is placed on lens holding portion 3s formed on the positioning member 3k, and the third lens group 3 is moved on a fine adjustment basis in the direction perpendicular to its optical axis for the fourth lens group 4 whose direction for its sliding movement has been determined in the preceding process. This center-aligning is carried out by arranging the imaging element behind the fourth lens group 4, for example, and arranging a prescribed lens group and a checking chart to be ahead of the third lens group 3, and by moving the third lens group 3 finely in the direction perpendicular to its optical axis under the state where the fourth lens group 4 has been moved to the prescribed position (for example, the position of wide angle), to evaluate images outputted from the imaging element, and thereby, by obtaining the position where marginal images are equalized. It is preferable that the lens holding portion 3s has room of about 0.2 mm-0.4 mm in the radial direction so that the third lens group 3 may move finely in the direction perpendicular to its optical axis.

After this center-aligning, the third lens group 3 is made to adhere to the lens holding portion 3s formed on the positioning member 3k, to be fixed. Incidentally, it is also possible to coat adhesive agents on the lens holding portion 3s in advance, and to place the third lens group 3 for center-aligning before the adhesive agents are solidified, so that the third lens group 3 is fixed as it is with solidification of the adhesive agents.

It is possible to position accurately the lens group which is located between an end portion on one side of the guide shaft and a positioning member and moves by sliding on the guide shaft in the direction perpendicular to the optical axis of the lens group, by providing the positioning member that positions the guide shaft at its intermediate portion, and by supporting the guide shaft with its end portion on one side and with the positioning member, as stated above. By dividing the lens barrel member in the direction of the optical axis, a space for inserting a jig for center-aligning which allows a lens group to move for fine adjustment can be secured, and interference with a lens barrel can be dissolved.

When the precision of aligning axes of the lens groups can be made to be within a tolerance only by parts accuracy of a positioning member arranged at an intermediate portion, the center-aligning stated above may also be omitted. In this case, radial dimensions of the lens holding portion 3s are made to be in a tolerance within which the third lens group 3 is fitted in or pressed into the lens holding portion 3s.

Figure 6:
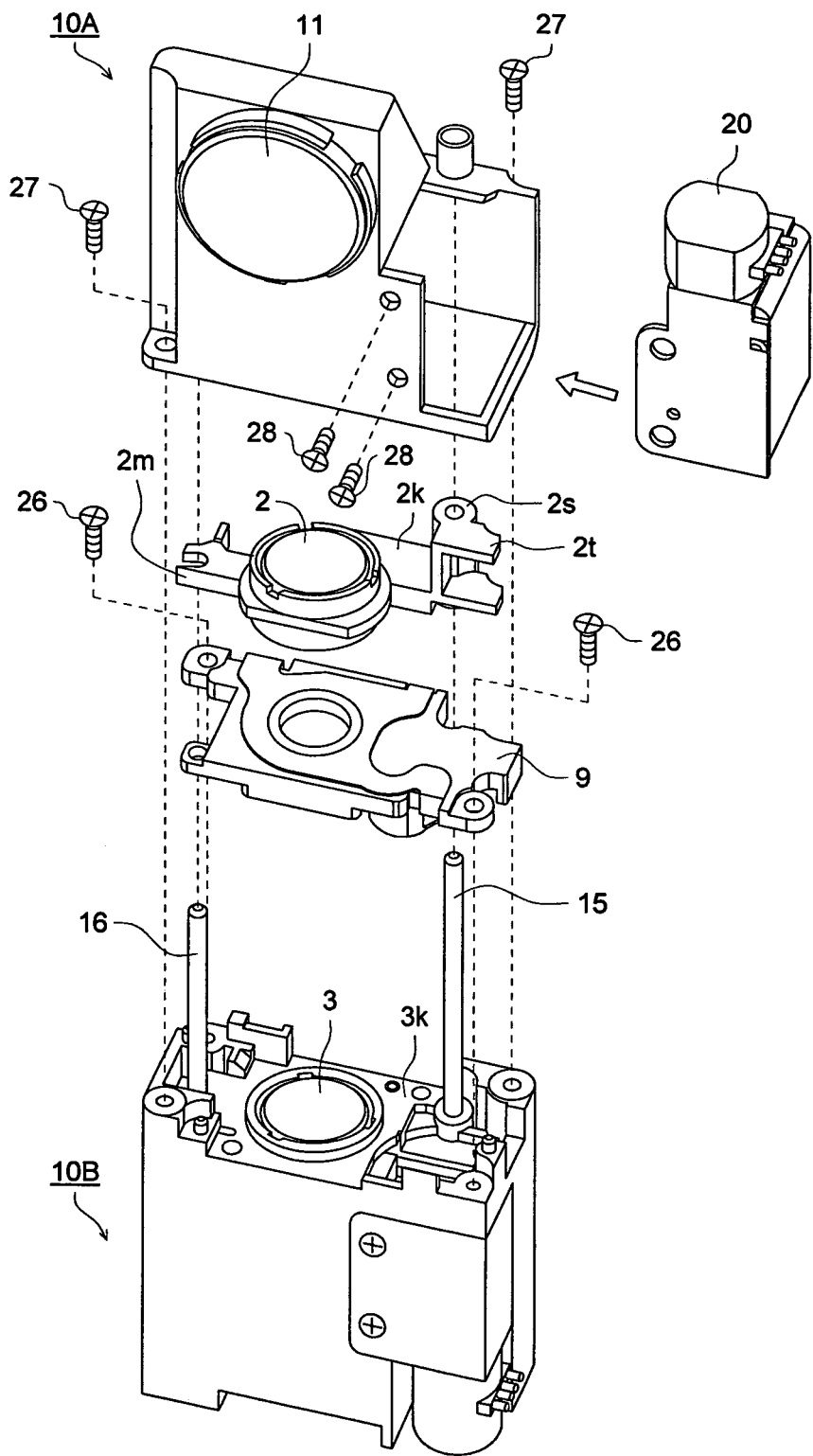
FIG. 6 is a diagram showing a process after the third lens group is placed on a positioning member, and is fixed after being subjected to center-aligning.

FIG. 6 is a diagram showing a process after the third lens group 3 is placed on positioning member 3k, and is fixed after being subjected to center-aligning.

As shown in FIG. 6, shutter unit 9 is fixed, by screws 26, on the second main barrel 10B having therein the poisoning member 3k and the third lens group 3. Then, in the following process, there is incorporated the second lens group holder 2k that holds the second lens group 2 which slides on the portion that is closer to the subject side than the positioning member 3k is. The second lens group holder 2k is incorporated on the second main barrel 10B, with the sleeve 2s in which the guide shaft 15 is fitted to pass through the sleeve and with the anti-rotation section 2m engaging with the guide shaft 16.

Then, on the second main barrel 10B, there is incorporated the first main barrel 10A including the second lens group 2 that slides on the portion closer to the subject side than the positioning member 3k is, and first motor 20 is incorporated so that projection 2t formed on the second lens group holder 2k may engage with driving member 20k for the first motor 20 (see FIG. 4). The first motor 20 is fixed by screws 28 to become a lens barrel relating to the invention.

Meanwhile, in the embodiment stated above, there has been explained an example wherein a guide shaft is positioned and supported at its end portion and its intermediate portion by a main barrel on one side positioned on the image plane side and by a positioning member, and center-aligning between adjoining lens groups is carried out after positioning the lens group that slides on the portion closer to the image plane side than the positioning member is. However, the invention is not limited to the foregoing. Namely, when center-aligning is necessary between a lens group positioned to be closer to the subject side than the positioning member is and a lens group supported by the positioning member, the structure wherein an end portion of the guide shaft is positioned on the main barrel on the other side positioned at the subject side and a positioning member formed to be incorporated in the foregoing positions and supports at an intermediate portion of the guide shaft, and a lens group sliding on the portion closer to the subject side than the positioning member is, and then, center-aligning is conducted on the lens group held by the positioning member, can be employed without departing from the spirit and scope of the invention.

Concerning the effect of the invention, in the lens barrel having therein a plurality of lens groups and a guide shaft that enables at least two lens groups to slide in the direction of an optical axis, by supporting the guide shaft with an end portion on one side of the guide shaft and with a positioning member that positions the guide shaft at its intermediate portion, the lens group that slides and moves between the positioning member and the end portion supported by the guide shaft can be positioned in the direction perpendicular to the optical axis before other lens groups are incorporated, thus, by positioning adjoining lens groups for the lens group positioned by the guide shaft, accurate aligning between specific lens groups can be done, and it is possible to obtain a lens barrel that achieves a camera lens with stable performance that causes no individual difference on an image taken by the camera lens.

It is further preferable to make an end portion on one side supporting the guide shaft to be an end portion located to be closer to the image plane side, which makes it possible to position accurately a lens group that is arranged to be closer to the image plane on a power-changing optical system and has high sensitivity for decentering.

Further, it is preferable that the positioning member holds a fixed lens group, and the fixed lens group is subjected to center-aligning and is fixed for the lens group positioned between an end portion on one side supporting the guide shaft and the aforesaid positioning member, thus, extremely accurate aligning between specific lens groups can be done, and it is possible to obtain a lens barrel that achieves a camera lens with stable performance that causes no individual difference on an image taken by the camera lens.

It is further preferable that this lens barrel is constructed to be divided into the first lens barrel member including the lens group sliding on the portion closer to the subject side than the positioning member is, and the second lens barrel member including the lens group sliding on the portion closer to the subject side than at least the positioning member is, whereby a lens barrel having no interference between the lens barrel and a jig for center-aligning can be obtained.

Further, when a reflection member that reflects light of a subject at right angles substantially is provided to be closer to the subject side than the lens group sliding on the guide shaft is, it is preferable that an end portion on the other side of the guide shaft is formed to extend toward the side of the reflection member, whereby, it is possible to secure a sufficient length of fitting for the guide shaft without increasing the total length of the lens barrel, which makes it possible for a lens group holder that holds a lens group to move more smoothly.

Further, a lens group that moves by sliding between the positioning member and an end portion where the guide shaft is supported can be positioned in the direction perpendicular to an optical axis before other lens groups are incorporated, owing to a method of assembling a lens barrel that has plural lens groups and guide shafts enabling at least two lens groups to slide in the direction of an optical axis of the invention wherein there are provided a process to fix an end portion on one side of the guide shaft, a process to incorporate a lens frame holding movable lens groups in the guide shaft, a process to fit a positioning member that positions the guide shaft at the intermediate portion of the guide shaft around the guide shaft to fix them, a process to place a lens group on the positioning member and to fix the lens group placed on the positioning member and a process to incorporate other lens groups on the guide shaft, and by positioning adjoining lens groups for the lens group positioned by the guide shafts, accurate aligning of an optical axis between specific lens groups can be done, and it is possible to obtain a method of assembling a lens barrel that achieves a camera lens with stable performance that causes no individual difference on an image taken by the camera lens.

In addition, in the process to place a lens group on the positioning member and to fix the lens group placed on the positioning member, the lens group placed on the positioning member is preferably subjected to center-aligning for movable lens groups, whereby, accurate aligning of optical axis between specific lens groups can be done, and it is possible to obtain a lens barrel that achieves a camera lens with stable performance that causes no individual difference on an image taken by the camera lens.

What is claimed is:

1. A lens barrel, comprising:
   a first moving lens group configured for advancing light of a subject onto an image plane;
   a second moving lens group configured for advancing light of the subject onto the image plane;
   a guide shaft configured for guiding the first moving lens group and the second moving lens group in a direction of an optical axis;
   an intermediate positioning section configured for fitting the guide shaft at an intermediate portion of the guide shaft to position and secure the intermediate portion of the guide shaft; and
   an end positioning section configured for fixing one end of the guide shaft;
   wherein the first moving lens group slides on a portion of the guide shaft that is closer to the subject than the intermediate positioning section is, and
   wherein the second moving lens group slides on a portion of the guide shaft that is closer to the image plane than the intermediate positioning section is.

2. The lens barrel of claim 1 wherein the end positioning section is positioned in adjacent to the image plane.

3. The lens barrel of claim 1 further comprising a fixed lens group which is supported by the intermediate positioning section, wherein the fixed lens group is fixed after center aligning of the second lens group is completed.

4. The lens barrel of claim 1 further comprising;
   a first barrel section including the first moving lens group that slides on the portion closer to the subject than the intermediate positioning section is; and
   a second barrel section including the second moving lens group that slides on the portion closer to the image plane than the intermediate positioning section is.

5. The lens barrel of claim 1 further comprising
   a reflection section that reflects light of the subject by about right angles, provided to be closer to the subject than the first moving lens group is, and another end of the guide shaft is formed to be extended toward the refection section.

6. A camera equipped with the lens barrel of claim 1.

7. A method of assembling a lens barrel including;
a first moving lens group configured for advancing light of a subject onto an image plane;
a second moving lens group configured for advancing light of a subject onto the image plane;
a guide shaft configured for guiding the first moving lens group and the second moving lens group in a direction of an optical axis;
an intermediate positioning section configured for supporting fitting the guide shaft at an intermediate portion of the guide shaft to position and secure the intermediate portion of the guide shaft;
an end positioning section for supporting one end of the guide shaft; and
a fixed lens group fixed on the intermediate positioning section, the method comprising steps of:
fixing one end of the guide shaft,
incorporating the second movable lens groups on the guide shaft,
fitting the intermediate positioning section for positioning and securing the guide shaft at the intermediate portion of the guide shaft,
placing and fixing the fixed lens group on the positioning section; and
incorporating the first movable lens group on the guide shaft.

8. The method of assembling the lens barrel of claim 7, further comprising a step of aligning a center of the fixed lens group, onto the center of the second moving lens group and the center of the first moving lens group.

* * * * *

UNITED STATES PATENT AND TRADEMARK OFFICE
CERTIFICATE OF CORRECTION

PATENT NO. : 7,635,228 B2 Page 1 of 1
APPLICATION NO. : 11/261239
DATED : December 22, 2009
INVENTOR(S) : Ishimoda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 702 days.

Signed and Sealed this

Ninth Day of November, 2010

David J. Kappos
*Director of the United States Patent and Trademark Office*